(12) United States Patent
Ohno et al.

(10) Patent No.: US 8,187,691 B2
(45) Date of Patent: May 29, 2012

(54) HONEYCOMB STRUCTURE

(75) Inventors: Kazushige Ohno, Gifu (JP); Masafumi Kunieda, Gifu (JP); Takahiko Ido, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 695 days.

(21) Appl. No.: 12/358,937

(22) Filed: Jan. 23, 2009

(65) Prior Publication Data

US 2009/0291253 A1 Nov. 26, 2009

(30) Foreign Application Priority Data

May 20, 2008 (WO) .................. PCT/JP2008/059265

(51) Int. Cl.
*B32B 3/12* (2006.01)
*B01J 29/04* (2006.01)
*B01J 29/06* (2006.01)
*C03C 10/12* (2006.01)
*C03C 10/02* (2006.01)

(52) U.S. Cl. ............... 428/116; 502/60; 502/67; 501/7; 501/9

(58) Field of Classification Search .................. None
See application file for complete search history.

(56) References Cited

U.S. PATENT DOCUMENTS

| | | | |
|---|---|---|---|
| 5,116,586 A | 5/1992 | Baacke et al. | |
| 6,413,898 B1 * | 7/2002 | Faber et al. | 502/64 |
| 7,727,923 B2 * | 6/2010 | Nakano et al. | 502/60 |
| 2006/0292393 A1 * | 12/2006 | Kunieda | 428/688 |
| 2007/0004593 A1 * | 1/2007 | Ohno et al. | 502/439 |
| 2007/0259770 A1 | 11/2007 | Hofmann et al. | |
| 2007/0269352 A1 | 11/2007 | Miyairi et al. | |

FOREIGN PATENT DOCUMENTS

| | | |
|---|---|---|
| EP | 1852184 | 11/2007 |
| EP | 1927391 | 6/2008 |
| EP | 1927392 | 6/2008 |
| EP | 2105271 | 9/2009 |
| EP | 2130591 | 12/2009 |
| JP | 08-229412 | 9/1996 |
| JP | 2004-202426 | 7/2004 |
| JP | 2007-296514 | 11/2007 |
| WO | WO 2005/063653 | 7/2005 |
| WO | WO 2006/070540 | 7/2006 |

* cited by examiner

*Primary Examiner* — Gordon R Baldwin (74) *Attorney, Agent, or Firm* — Ditthavong Mori & Steiner, P.C.

(57) ABSTRACT

A honeycomb structure includes at least one honeycomb unit. The at least one honeycomb unit has a longitudinal direction and includes zeolite and an inorganic binder. A content of the zeolite per apparent unit volume of the at least one honeycomb unit is about 230 g/L or greater. The at least one honeycomb includes plural cell walls extending from one end face to another end face along the longitudinal direction to define plural cell walls. A porosity of substantially all pores in the cell walls is about 40% or less. A porosity of pores having diameters in a range of about 0.005 μm through about 0.02 μm in the cell walls is about 5% or greater. A porosity of pores having diameters in a range of about 0.05 μm through about 0.2 μm in the cell walls is about 17.5% or greater.

36 Claims, 4 Drawing Sheets

HONEYCOMB STRUCTURE

CROSS-REFERENCE TO RELATED APPLICATION

The present application claims priority under 35 U.S.C §119 to International Application No. PCT/JP2008/059265 filed on May 20, 2008, the entire contents of which are incorporated by reference herein.

BACKGROUND OF THE INVENTION

1. Field of the Invention

The present invention relates to a honeycomb structure.

2. Discussion of Background

In order to convert exhaust gases from automobiles, many technologies have been developed. Due partly to an increase in traffic, it is, however, hard to say that adequate measures have been taken. Controlling exhaust gases from automobiles tends to be further intensified domestically and internationally. Particularly, NOx in diesel exhaust gas is strictly controlled. The reduction of NOx has been attempted by the control of the burning system of an engine, but it becomes difficult for this method alone to sufficiently deal with the problem. As a diesel NOx conversion system for this problem, a NOx reduction system (called an SCR system) that reduces NOx using ammonia as a reducing agent has been proposed.

As a catalyst carrier used for such a system, a honeycomb structure is known. The honeycomb structure of International Publication No. 2005/063653 discloses a honeycomb catalyst formed of honeycomb units obtained by mixing γ-alumina, ceria, zirconia, zeolite, etc., with inorganic fibers and an inorganic binder, then molding the mixture into a honeycomb shape, and after that firing the molded material.

JP-A-08-229412 discloses a honeycomb-shaped catalyst for eliminating NOx in which the volume of pores having diameters in the range of 0.01 μm through 0.03 μm in cell walls accounts for 50% through 80% of the volume of all the pores and the volume of pores having diameters in the range of 0.8 μm through 4 μm in the cell walls accounts for 10 through 30% thereof. Catalyst components of this honeycomb-shaped catalyst should be oxides containing titanium or composite oxides.

The contents of Pamphlet of International Publication No. 2005/063653 and JP-A-08-229412 are incorporated by reference herein in their entirety.

SUMMARY OF THE INVENTION

According to an aspect of the present invention, a honeycomb structure includes at least one honeycomb unit. The at least one honeycomb unit has a longitudinal direction and includes zeolite and an inorganic binder. A content of the zeolite per apparent unit volume of the at least one honeycomb unit is about 230 g/L or greater. The at least one honeycomb includes plural cell walls extending from one end face to another end face along the longitudinal direction to define plural cell walls. A porosity of substantially all pores in the cell walls is about 40% or less. A porosity of pores having diameters in a range of about 0.005 μm through about 0.02 μm in the cell walls is about 5% or greater. A porosity of pores having diameters in a range of about 0.05 μm through about 0.2 μm in the cell walls is about 17.5% or greater.

BRIEF DESCRIPTION OF THE DRAWINGS

Embodiments will now be described with reference to the accompanying drawings, wherein like reference numerals designate corresponding or identical elements throughout the various drawings.

Other objects, features and advantages of the present invention will become more apparent from the following detailed description when read in conjunction with the accompanying drawings, in which:

FIGS. 1A and 1B are perspective views of honeycomb structures according to an embodiment of the present invention, wherein

DETAILED DESCRIPTION OF THE EMBODIMENTS

A honeycomb structure according to an embodiment of the present invention has one or more honeycomb units in which zeolite and an inorganic binder are contained and plural cells extending from one end face to the other end face along the longitudinal direction are partitioned by cell walls. An example of the honeycomb structure is shown in the perspective view of FIG. 1A. In the honeycomb structure 1 shown in FIG. 1A, plural honeycomb units 2 bonded together by interposing a bonding material 5 are arranged. Each of the honeycomb units 2 is formed so that cells 3 are arrayed in parallel in the longitudinal direction. Note that the side surface (surface at which the cells 3 are not opened) of the honeycomb structure 1 is preferably covered with a coating material layer 6 so as to maintain its strength. As exemplified in the perspective view of FIG. 2, the honeycomb unit 2, plural of which constitute the honeycomb structure 1, is composed of plural of the cells 3 extending in the longitudinal direction and cell walls 4 partitioning the cells 3.

In the honeycomb unit 2 of the honeycomb structure 1 according to the embodiment of the present invention, the content of zeolite per apparent unit volume of the honeycomb unit 2 is preferably about 230 g/L or greater and more preferably in the range of about 245 through about 270 g/L. If the zeolite content is 230 g/L or greater, NOx conversion performance is not easily degraded. In addition, if the content is about 270 g/L or less, the strength not only of the honeycomb unit 2 but also of the honeycomb structure 1 is easily maintained when openings required in the honeycomb unit 2 for an NOx conversion catalyst are formed.

(Pore Structure of Cell Wall of Honeycomb Unit)

The honeycomb unit 2 of the honeycomb structure 1 according to the embodiment of the present invention has a porosity characteristic in the pore structure of the cell walls 4. According to this characteristic, the porosity of all the pores in the cell walls 4 (proportion of pore capacity to the unit volume of the cell walls 4) is about 40% or less, the porosity of pores having diameters in the range of about 0.005 μm through about 0.02 μm in the cell walls 4 is about 5% or greater, and the porosity of pores having diameters in the range of about 0.05 μm through about 0.2 μm in the cell walls 4 is about 17.5% or greater. Here, the pore volume of the pores having the diameters in the range of about 0.005 μm through about 0.02 μm in the cell walls 4 preferably accounts for about 13% through about 41% of the pore volume of all the pores, and the pore volume of the pores having the diameters in the range of about 0.05 μm through about 0.2 μm in the cell walls 4 preferably accounts for about 46% through about 76% thereof. Note that the porosity of all the pores and the porosity of the pores corresponding to respective diameters can be measured with a mercury penetration method.

Figure 3:
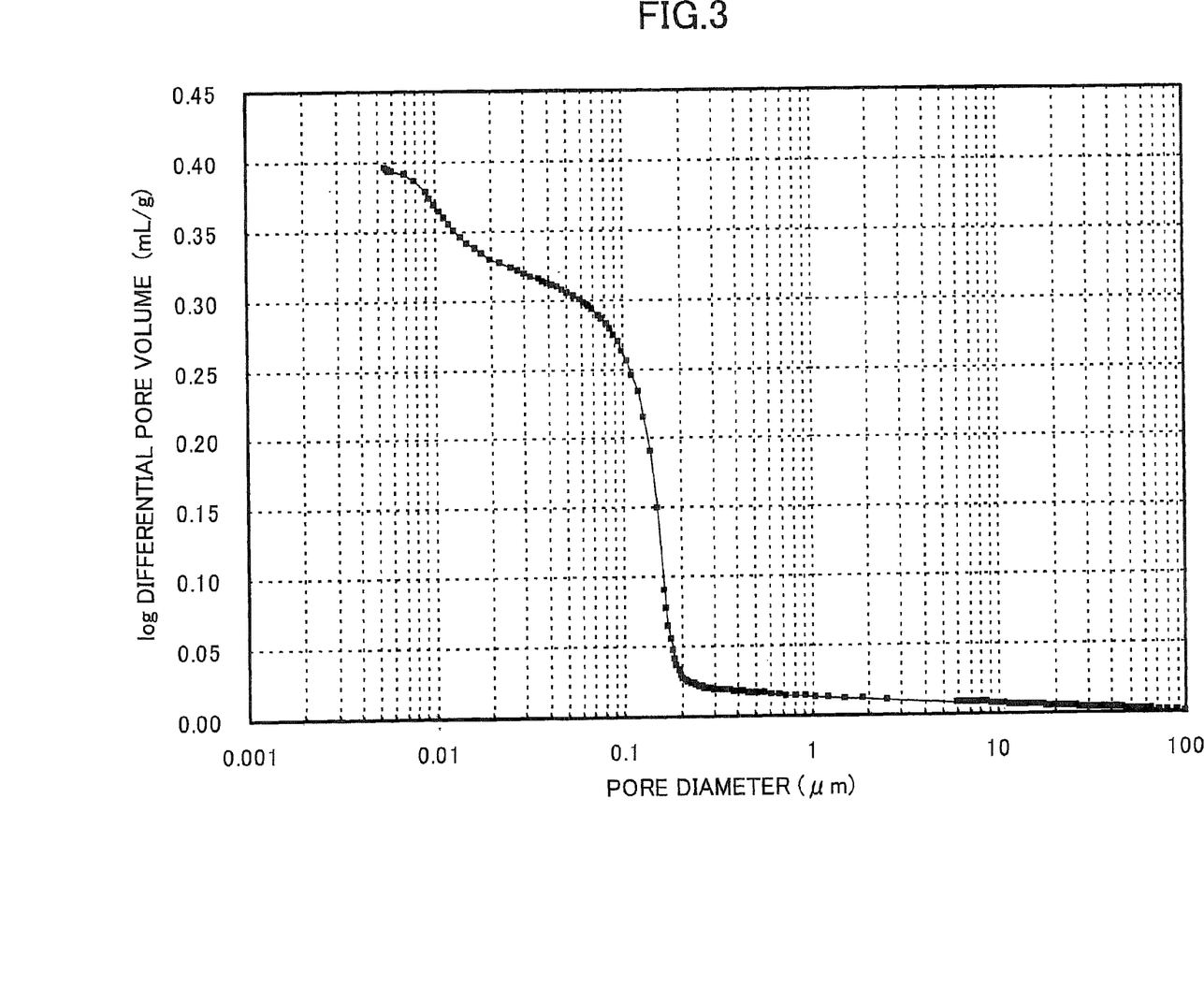
FIG. 3 is a graph showing the structure of pores formed in cell walls of the honeycomb unit constituting the honeycomb structure in example 3.

As exemplified in FIG. 3, pores having diameters in the range of about 0.005 μm or less through several tens of μm or larger are formed in the pore structure of the cell walls 4. Among them, the pores having the diameters in the range of about 0.05 μm through about 0.2 μm and the pores having the diameters in the range of about 0.005 μm through about 0.02 μm are relatively high in number (hereinafter the pores having the diameters in the range of about 0.005 μm through about 0.02 μm in the cell walls 4 are referred to as micro pores, and the pores having the diameters in the range of about 0.05 μm through about 0.2 μm in the cell walls 4 are referred to as macro pores). When zeolite, inorganic particles excluding the zeolite, etc., are fired, it appears that pores derived mainly from primary particles, particularly from the crystal structure of the zeolite, etc., and pores derived from gaps generated mainly when secondary particles are bonded together are formed in the fired body.

When the honeycomb unit 2 having such pores is used as a NOx conversion catalyst for exhaust gas, it may be important for exhaust-gas conversion performance to have a balance between the pores serving not only as adsorption sites for ammonia but also as reaction sites for NOx conversion and the pores serving as gas flow passages for penetration of exhaust gas into the micro pores inside the cell walls 4. From the viewpoint of the exhaust-gas conversion performance, if the micro pores (pores having the diameters in the range of about 0.005 μm through about 0.02 μm in the cell walls 4) are increased, the reaction sites increase, which may make it easier to improve the NOx conversion performance. In addition, if the macro pores (pores having the diameters in the range of about 0.05 μm through about 0.2 μm in the cell walls 4) are increased, exhaust gas can hardly penetrate into the cell walls 4, which makes it possible to improve NOx conversion speed. From the viewpoint of a quantitative study, if the porosity of the micro pores is about 5% or greater, the effective reaction sites do not easily become insufficient, which makes it possible to easily maintain the NOx conversion performance. In addition, if the porosity of the macro pores is less than about 17.5% or greater, the penetration speed of NOx gas to the reaction sites of the micro pores in all the cell walls does not easily become slow, which makes it possible to easily maintain the NOx conversion performance corresponding to the NOx conversion speed of the reaction sites.

On the other hand, from the viewpoint of the practical strength of the honeycomb unit 2 as a structure and the restriction of its size, there may be a limitation to increasing the pores. If the porosity of all the pores in the cell walls 4 exceeds about 40% or less, the bulk density of the cell walls 4 does not become too low, which easily makes the strength of the honeycomb unit 2 as a structure insufficient. In addition, the volume of the honeycomb unit 2 does not become too large even with the same catalyst amount, which is preferable in use.

Moreover, from the viewpoint of the balance between the porosity of all the pores, the porosity of the micro pores, and the porosity of the macro pores in the cell walls 4, the porosity of the micro pores and the porosity of the macro pores relative to the porosity of all of the pores are preferably about 13% through about 41% and about 46% through about 76%, respectively. If the proportion of the porosity of the micro pores to the porosity of all of the pores is about 13% or greater, the reaction sites do not easily become small. Therefore, even if the proportion of the porosity of the macro pores is not increased, the NOx conversion performance can easily sufficiently be improved. If the proportion of the porosity of the macro pores to the porosity of all the pores is about 46% or greater, exhaust gas can easily penetrate into the cell walls 4. As a result, even if the proportion of the porosity of the micro pores is not increased, the NOx conversion performance cannot be easily sufficiently improved. Furthermore, if the honeycomb unit 2 is manufactured on the condition that the proportion of the porosity of the macro pores is about 46% or greater and the proportion of the porosity of the micro pores is greater than about 41%, the manufacturing technique becomes difficult. Similarly, if the honeycomb unit 2 is manufactured on the condition that the proportion of the porosity of the micro pores is about 13% or greater and the proportion of the porosity of the macro pores is greater than about 76%, the manufacturing technique becomes difficult.

(Honeycomb Unit)

Figure 2:
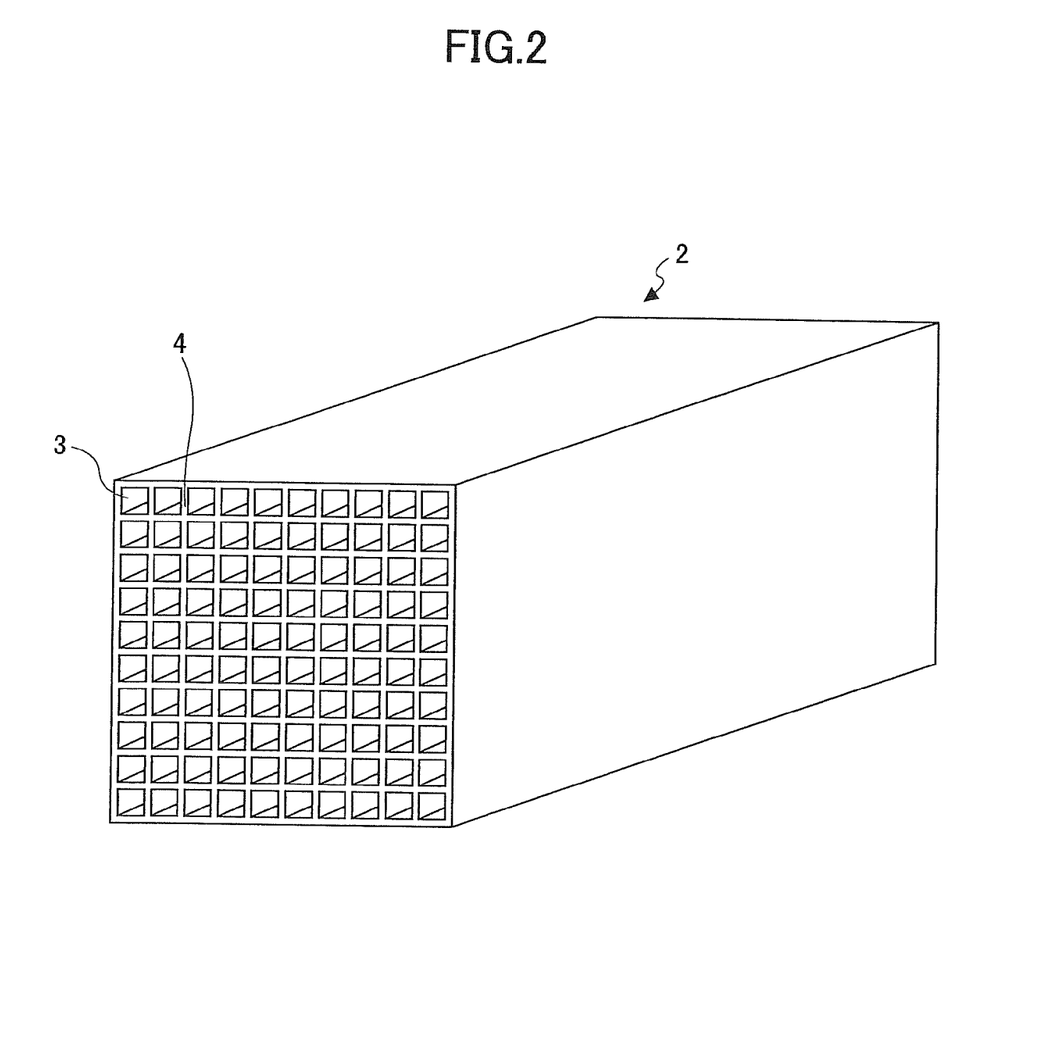
FIG. 2 is a perspective view of the honeycomb unit constituting the honeycomb structure of FIG. 1.

The honeycomb unit 2 of the honeycomb structure 1 according to the embodiment of the present invention has a so-called honeycomb structure in which the plural cells 3 as parallel through-holes are provided in the longitudinal direction of the honeycomb unit 2. The cross-sectional shape of each of the cells 3 in the honeycomb unit 2 is not particularly limited. In FIG. 2, the cells 3 having a square cross section are shown, but the cross-sectional shape of the cells 3 may be approximately a triangle, approximately a hexagon, a circle, the combination of a rectangle and an octagon, or the like.

The porosity of the cell walls 4 of the honeycomb unit 2 is preferably about 40% or less and more preferably in the range of about 25% through about 40%. From the viewpoint of a quantitative study, if the porosity is about 20% or greater, particularly about 25% or greater, exhaust gas can easily penetrate sufficiently into the back of the cell walls 3, which does not easily make the NOx conversion rate insufficient. In addition, if the porosity is about 40% or less, the strength of the cell walls 4 is not easily reduced.

An opening rate as an area rate of opening parts in the cross section (surface at which the plural cells 3 are opened) perpendicular to the longitudinal direction of the cells 3 of the honeycomb unit 2 is preferably in the range of about 50% through about 65%. The opening rate of the honeycomb unit 2 is preferably about 50% or greater because its pressure loss is not easily increased and preferably about 65% or less because the cell walls 4 that exercise a conversion action are easily ensured.

The thickness of the cell walls 4 of the honeycomb unit 2 is preferably about 0.15 mm or greater and about 0.35 mm or less and is more preferably about 0.15 mm or greater and about 0.27 mm or less. If the thickness of the cell walls 4 is about 0.15 mm or greater, the strength of the honeycomb unit 2 is easily maintained. In addition, if the thickness of the cell walls 4 is about 0.35 mm or less, exhaust gas can easily penetrate into the cell walls 4, which does not easily degrade the NOx conversion performance.

The honeycomb unit 2 of the honeycomb structure 1 according to the embodiment of the present invention contains zeolite and an inorganic binder, but it may further contain inorganic particles and inorganic fibers other than the zeolite.

(Zeolite)

Zeolite in the honeycomb unit 2 is obtained by bonding zeolite particles together with an inorganic binder. Examples of the zeolite include β zeolite, Y zeolite, ferrierite, ZSM5 zeolite, mordenite, faujasite, zeolite A, and zeolite L. They may be used singly or in combination.

In addition, ion-exchange zeolite obtained by exchanging the ions of the above zeolite may preferably be used. The honeycomb unit 2 may be formed by the use of zeolite whose ions are exchanged in advance, or the ions of zeolite may be exchanged after the honeycomb unit 2 is formed. The ion-exchange zeolite whose ions are exchanged by at least one metal species out of Fe, Cu, Ni, Co, Zn, Mn, Ti, Ag, and V is preferably used. The ion-exchange zeolite may use the metal species singly or in combination.

As the zeolite, a molar ratio of silica to alumina (silica/alumina ratio) is preferably in the range of about 30 through about 50.

The content of the zeolite per apparent unit volume of the honeycomb unit 2 is preferably about 230 g/L or greater and more preferably in the range of about 245 g/L through about 270 g/L. In other respects, the content (composition rate) of the zeolite in the honeycomb unit 2 is preferably in the range of about 60 mass % through about 80 mass %. Because the zeolite contributes to NOx conversion, its content in the honeycomb unit 2 is preferably large. However, if only the content of the zeolite is increased, the content of other constituent substances (such as inorganic fibers and an inorganic binder) must be decreased. As a result, the strength of the honeycomb unit 2 as a fired body is easily reduced. In addition, if the opening rate of the honeycomb unit 2 is made too small in order to increase the content of the zeolite, the flow resistance of exhaust gas may become too large in NOx conversion reaction.

The zeolite contains secondary particles, and an average particle diameter of the secondary particles of the zeolite is preferably in the range of about 0.5 µm through about 10 µm. Note that when the average particle diameter of the secondary particles is measured, zeolite particles as particulate raw materials forming the secondary particles before being fired as the honeycomb unit 2 may be used.

(Inorganic Binder)

Because the honeycomb unit 2 is a fired product, it has only a solid content left therein when water, etc., in an inorganic binder are evaporated. The inorganic binder in the honeycomb unit 2 refers to the solid content in the inorganic binder. Examples of the inorganic binder as raw material include inorganic sol and clay binders. Among them, examples of the inorganic sol include alumina sol, silica sol, titania sol, sepiolite sol, attapulgite sol, and water glass. Examples of the clay binders include white earth, kaolin, montmorillonite, and double-chain structure clays (sepiolite and attapulgite). These inorganic sol and clay binders may be used singly or in combination.

(Inorganic Particles)

In the honeycomb structure 1 according to the embodiment of the present invention, the honeycomb unit 2 may contain inorganic particles other than the zeolite particles. The inorganic particles other than the zeolite particles may contribute to an improvement in the strength of the honeycomb unit 2. In the honeycomb structure 1 according to the embodiment of the present invention, the inorganic particles other than the zeolite particles contained in the honeycomb unit 2 are not particularly limited. However, examples of the inorganic particles involved include alumina particles, silica particles, zirconia particles, titania particles, ceria particles, mullite particles, and precursors thereof. Among them, the alumina particles or zirconia particles are desirable, and γ-alumina particles and boehmite are preferably used. Note that the honeycomb unit 2 may contain these inorganic particles other than the zeolite particles singly or in combination.

The inorganic particles other than the zeolite particles in the honeycomb structure 1 according to the embodiment of the present invention have a hydroxyl group when they are inorganic particles as raw material before being fired. As is the case with many industrially available inorganic compound particles, a hydroxyl group may be provided not only in the inorganic particles as raw material before being fired in the honeycomb structure 1 according to the embodiment of the present invention, but also provided in the zeolite particles as raw material. These hydroxyl groups may cause a dehydration condensation reaction to occur when being fired as the honeycomb unit 2 to reinforce the bonding between the particles. Particularly, the inorganic particles as raw material including alumina particles may be firmly bonded together through the dehydration condensation reaction occurring when the hydroxyl groups are fired.

In the honeycomb structure 1 according to the embodiment of the present invention, the inorganic particles other than the zeolite particles as raw material are preferably configured so that an average particle diameter of their secondary particles is smaller than or equal to an average particle diameter of the secondary particles of the zeolite. Particularly, the average particle diameter of the inorganic particles other than the zeolite particles is preferably in the range of about one-first through about one-tenth of the average particle diameter of the zeolite. Thus, the strength of the honeycomb unit 2 may be improved through the bonding force of the inorganic particles whose average particle diameter is small.

The content of the inorganic particles other than the zeolite contained in the honeycomb unit 2 is preferably in the range of about 3 mass % through about 30 mass % and more preferably in the range of about 5 mass % through about 20 mass %. If the content is about 3 mass % or greater, the contribution to the strength of the honeycomb unit 2 does not easily become small. If the content is about 30 mass % or less, the content of the zeolite contributing to NOx conversion does not easily become relatively small. As a result, the NOx conversion performance is not easily degraded.

(Inorganic Fibers)

In the honeycomb structure 1 according to the embodiment of the present invention, the honeycomb unit 2 may contain inorganic fibers. The inorganic fibers contained in the honeycomb unit 2 are not particularly limited. Examples of the inorganic fibers include one or two or more inorganic fibers selected from alumina fibers, silica fibers, silicon carbide fibers, silica alumina fibers, glass fibers, potassium titanate fibers, and aluminum borate fibers. In order to mold and fire the honeycomb unit 2, the zeolite and the inorganic binders are mixed together when these inorganic fibers are used as raw material. The inorganic fibers contribute to the improvement in the strength of the honeycomb unit 2. Note that the inorganic fibers may not only be long fibers but also be short fibers such as whiskers.

The inorganic fibers are inorganic materials having a large aspect ratio (fiber length/fiber diameter), and they are effective particularly for improving bending strength. The aspect ratio of the inorganic fibers is preferably in the range of about 2 through about 1000, more preferably in the range of about 5 through about 800, and particularly preferably in the range of about 10 through about 500. If the aspect ratio of the inorganic fibers is about 2 or greater, the contribution to the improvement in the strength of the honeycomb unit 2 does not easily become small. If the aspect ratio is 1000 or less, clogging, etc., are not easily likely to occur in a molding die when the honeycomb unit 2 is molded. As a result, moldability is not easily degraded. In addition, when the honeycomb unit 2 is molded, for example, through extrusion molding, the inorganic fibers are not easily folded and the lengths of the inorganic fibers are not easily varied. As a result, the strength of the honeycomb unit 2 is not easily reduced. Here, if there is a distribution of the aspect ratio of the inorganic fibers, its average value is used.

The content of the inorganic fibers contained in the honeycomb unit 2 is preferably in the range of about 3 mass % through about 50 mass %, more preferably in the range of about 3 mass % through about 30 mass %, and particularly preferably in the range of about 5 mass % through about 20 mass %. If the content is about 3 mass % or greater, the contribution to the strength of the honeycomb structure 1 does not easily become small. If the content is 50 mass % or less, the amount of the zeolite contributing to NOx conversion does not become easily relatively small. As a result, the NOx conversion performance of the honeycomb structure 1 is not easily degraded.

(Catalyst Component)

On the cell walls 4 of the honeycomb unit 2 of the honeycomb structure 1 according to the embodiment of the present invention, a catalyst component may be further supported. The catalyst component is not particularly limited, but precious metals, alkali metal compounds, alkali earth metal compounds, etc., may be used. Examples of the precious metals include one or more selected from platinum, palladium, and rhodium. Examples of the alkali metal compounds include one or more selected from potassium and sodium compounds. Examples of the alkaline earth metal compounds include barium compounds.

(Manufacturing of Honeycomb Unit)

A description is made of an example of a method for manufacturing the honeycomb unit 2 of the honeycomb structure 1 according to the embodiment of the present invention. First, a raw material paste containing the zeolite and the inorganic binder as main components is manufactured, and then it is extrusion-molded to be a honeycomb unit molded body. In addition to the zeolite and the inorganic binder, the inorganic fibers, the inorganic particles, an organic binder, a pore forming material, a dispersion medium, a molding auxiliary agent, etc., may be added to the raw material paste as occasion demands. The organic binder is not particularly limited. Examples of the organic binder include one or two or more organic binders selected from methyl cellulose, carboxymethyl cellulose, hydroxyethyl cellulose, polyethylene glycol, phenol resin, epoxy resin, etc. The blending amount of the organic binder is preferably in the range of about 1 through about 10 parts by mass relative to 100 parts by mass in total of the solid content of all of the material. As the pore forming material, resin powder such as an acrylate resin, a polyolefin resin, a polystyrene resin, and a polyester resin can be used. The organic binder and the pore forming material are important for extrusion molding and adjusting the porosity of the honeycomb unit 2. The amount of the pore forming material may be increased and decreased corresponding to a desired porosity. The dispersion medium is not particularly limited. Examples of the dispersion medium include water, organic solvents (such as toluene), and alcohol (such as methanol). The molding auxiliary agent is not particularly limited. Examples of the molding auxiliary agent include ethylene glycol, dextrin, fatty acid soap, and polyalcohol.

The raw material paste is not particularly limited, but it is preferably mixed and kneaded. In this case, the raw material paste may be mixed through a mixer, an attoritor, etc., and adequately kneaded through a kneader, etc. A method for molding the raw material paste is not particularly limited, but the raw material paste is preferably molded into a shape having a predetermined cell density and opening rate, for example, through extrusion molding.

Next, the honeycomb unit molded body thus obtained is dried. A drying apparatus for drying the molded body is not particularly limited. Examples of the drying apparatus include a microwave drying apparatus, a hot-air drying apparatus, a dielectric drying apparatus, a pressure-reduction drying apparatus, a vacuum drying apparatus, and a freeze drying apparatus. The dried molded body is preferably degreased. Degreasing conditions are not particularly limited, and they can appropriately be selected according to the kinds and amounts of organic matter contained in the molded body. However, the honeycomb unit molded body is preferably degreased for about two hours at about 400° C. The honeycomb unit molded body after being dried and degreased is fired. Firing conditions are not particularly limited, but a firing temperature is preferably in the range of about 600° C. through about 1200° C. and more preferably in the range of about 600° C. through about 1000° C. If the firing temperature is about 600° C. or higher, the sintering of the zeolite, etc., easily progresses. As a result, the strength of the honeycomb unit 2 is easily improved. On the other hand, if the firing temperature is about 1200° C. or lower, the crystallization of the zeolite does not easily disintegrate and the sintering of the honeycomb unit molded body does not excessively progress. As a result, the porous honeycomb unit 2 having a proper porosity is easily manufactured.

(Honeycomb Structure)

The honeycomb structure 1 according to the embodiment of the present invention has the one or more honeycomb units 2. In the honeycomb structure 1 having the plural honeycomb units 2, the through-holes of the cells 3 of the honeycomb units 2 are arranged in a stacked manner so as to face the same direction. Examples of the honeycomb structure 1 according to the embodiment of the present invention are shown in the perspective views of FIGS. 1A and 1B. In the honeycomb structure 1 shown in FIG. 1A, the plural honeycomb units 2 bonded together by the bonding material 5 are arranged. Each of the honeycomb units 2 is formed so that the cells 3 are arrayed in parallel in the longitudinal direction. As an example, the honeycomb structure 1 shown in FIG. 1B is composed of one honeycomb unit 2. As described above, the honeycomb structure 1 may be composed of the one honeycomb unit 2 or plural honeycomb units 2. Note that the side surface (surface parallel to the longitudinal direction of the cells 3 just referred to as a cross section, and the same applies to the below) of the honeycomb structure 1 is preferably covered with the coating material layer 6 so as to maintain its strength.

Figure 1A:
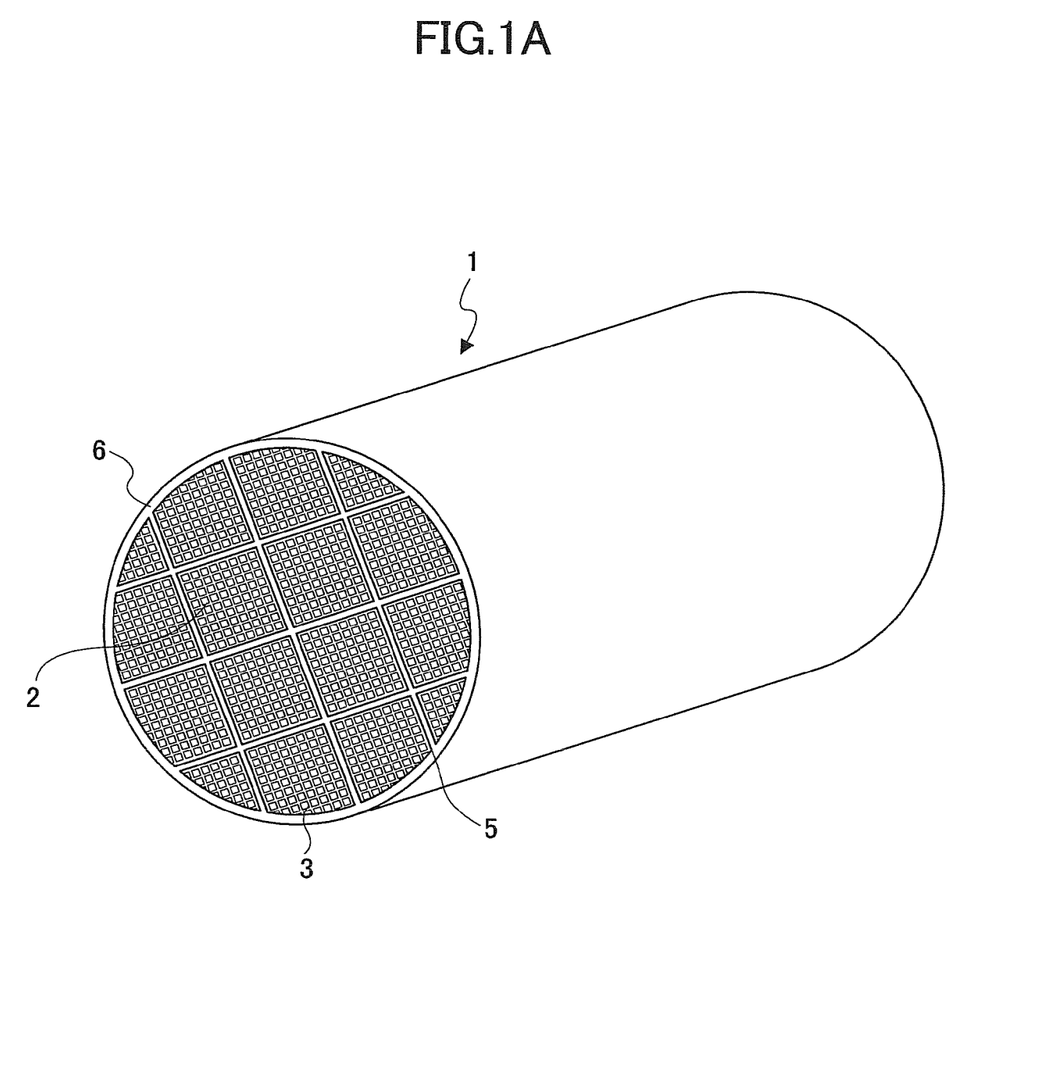
FIG. 1A is the honeycomb structure composed of plural honeycomb units and FIG. 1B is the honeycomb structure composed of one honeycomb unit.
Figure 1B:
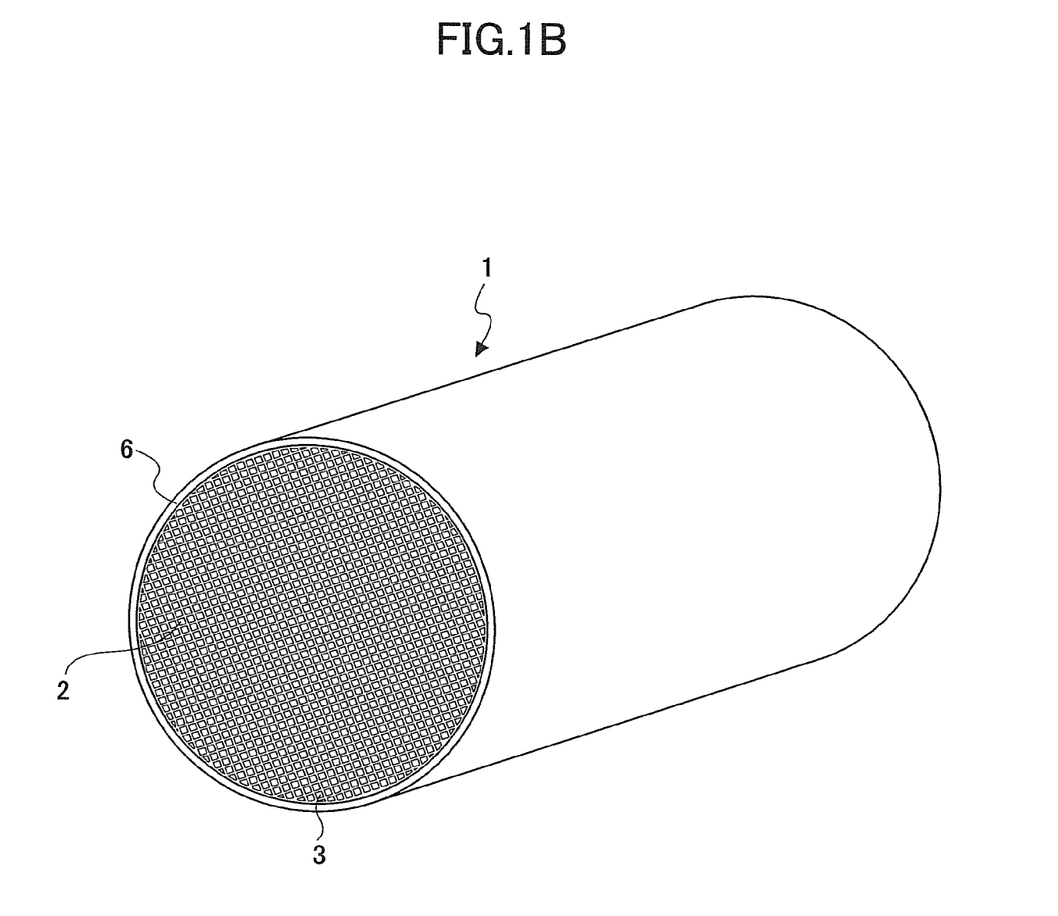

The honeycomb structures 1 shown in FIGS. 1A and 1B have circular cross sections. In the honeycomb structure 1 according to the embodiment of the present invention, the cross section of the honeycomb structure 1 may be a square, a rectangle, a hexagon, a sector form, etc. The cross section of the honeycomb structure 1 may be determined according to use modes, but its cross-sectional area is preferably the same with respect to the longitudinal direction of the honeycomb unit 2. In addition, the periphery of the honeycomb structure 1 may or may not be cut.

(Manufacturing of Honeycomb Structure)

First, a description is made of a method for manufacturing the honeycomb structure 1 composed of the plural honeycomb units 2. The bonding material 5 is coated on the side surfaces of the honeycomb units 2 obtained in the above manner, and then the honeycomb units 2 are successively bonded together. The aggregate of the bonded honeycomb units 2 is dried and solidified to manufacture a honeycomb unit aggregate of a predetermined size. After that, the side surface of the honeycomb unit aggregate is cut into a desired shape.

The bonding material 5 is not particularly limited. Examples of the bonding material 5 include a mixture of the inorganic binder and the inorganic particles, a mixture of the inorganic binder and the inorganic fibers, a mixture of the inorganic binder, the inorganic particles, and the inorganic fibers, etc. In addition, a mixture of these bonding materials and the organic binder may be used. The organic binder is not particularly limited. Examples of the organic binder include one or two or more organic binders selected from polyvinyl alcohol, methyl cellulose, ethyl cellulose, carboxymethyl cellulose, etc.

The thickness of a bonding material layer for bonding the plural honeycomb units 2 together is preferably in the range of about 0.5 mm through about 2 mm. The number of the bonded honeycomb units 2 may appropriately be determined corresponding to the size of the honeycomb structure 1. The honeycomb unit aggregate obtained by bonding the honeycomb units 2 together by interposing the bonding material 5 may appropriately be cut and polished corresponding to the shape of the honeycomb structure 1.

A coating material is coated on the peripheral surface (side surface) parallel to the through-holes of the cells 3 of the honeycomb structure 1 and then dried and solidified to form the coating material layer 6. Thus, the peripheral surface of the honeycomb structure 1 is protected, which in turn can improve the strength of the honeycomb structure 1. The coating material is not particularly limited, and it may be made of a material the same as or different from the bonding material 5. In addition, the blending ratio of the coating material may be the same as or different from the blending ratio of the bonding material 5. The thickness of the coating material layer 6 is not particularly limited, but it is preferably in the range of about 0.1 mm through about 2 mm. The coating material layer 6 may or may not be formed.

The honeycomb structure 1 is preferably heated after the plural honeycomb units 2 are bonded together by interposing the bonding material 5. If the coating material layer 6 is formed, the honeycomb structure 1 is preferably degreased after the bonding material layer and the coating material layer 6 are formed. If the organic binder is contained in the bonding material layer and the coating material layer 6, the organic binder can be degreased and eliminated through degreasing. The degreasing conditions may appropriately be determined according to the kinds and amounts of the organic matters contained, but the organic binder is preferably degreased for about two hours at about 700° C.

As an example of the honeycomb structure 1, FIG. 1A shows a conceptual diagram of the cylindrical honeycomb structure 1 in which the rectangular-parallelepiped honeycomb units 2 whose cross section perpendicular to the longitudinal direction of the through-holes is a square are bonded together. In the honeycomb structure 1, the honeycomb units 2 are bonded together by interposing the bonding material 5. Furthermore, the peripheral surface of the honeycomb structure 1 is cut into a cylindrical shape, and then the coating material is used to form the coating material layer 6 on the peripheral surface. Note that it is also possible to provide a predetermined honeycomb structure 1 using the bonded honeycomb units 2 manufactured to have its cross section of a sector form or a square. Thus, the steps of cutting and polishing the honeycomb unit aggregate may be omitted.

Second, a description is made of a method for manufacturing the honeycomb structure 1 as shown in FIG. 1B composed of one honeycomb unit 2. The honeycomb structure 1 of FIG. 1B can be manufactured in the same manner as the honeycomb structure 1 of FIG. 1A except that it is composed of one honeycomb unit 2. In the same manner as when the honeycomb structure 1 composed of plural honeycomb units 2 is manufactured, the honeycomb unit 2 is cut into a cylindrical shape and then polished as occasion demands, and the bonding material 5 the same as the above is used to form the coating material layer 6 on the side surface of the honeycomb unit 2. After that, the honeycomb structure 1 is degreased. In this manner, the honeycomb structure 1 composed of one honeycomb unit 2 as shown in FIG. 1B can be manufactured.

When the honeycomb units of the honeycomb structure of International Publication No. 2005/063653 are manufactured by the use of zeolite as a main raw material so as to be used for the SCR system, the honeycomb units may have poor NOx conversion performance due to insufficient study of the structure of pores.

Furthermore, when only zeolite is used instead of the oxides containing titanium in the honeycomb-shaped catalyst of JP-A-08-229412, satisfactory conversion performance may not be attained. That is, the crystallization of zeolite generally has pores having diameters in the range of about 0.005 μm through 0.01 μm in its crystal structure, and many reaction active sites exist at the front surfaces of the pores in the crystal structure. Therefore, when zeolite is used in this honeycomb-shaped catalyst, the honeycomb-shaped catalyst may not serve as a NOx conversion catalyst having satisfactory reaction active sites even if the pores having diameters in the range of 0.01 μm or greater are specified.

According to the embodiment of the present invention, it is possible to provide the honeycomb structure capable of efficiently offering high NOx conversion performance using zeolite considered to have an excellent function as a NOx conversion catalyst for exhaust gases from automobiles.

EXAMPLES

Next, a description is made of examples of the honeycomb structure 1 manufactured under various conditions, but the present invention is not limited to the examples.

Example 1

(Manufacturing of Honeycomb Unit)

First, 2400 parts by mass of Fe ion-exchange β zeolite (Fe ion-exchange: 3 mass %, silica/alumina ratio: 40, specific surface area: 110 m$^2$/g, and average particle diameter (of secondary particle diameter, and the same applies to the below): 2 μm), 2600 parts by mass of alumina sol (solid concentration: 20 mass %), 780 parts by mass of alumina fibers (average fiber diameter: 6 μm and average fiber length: 100 μm), and 410 parts by mass of methyl cellulose as an organic binder were put in a container for manufacturing a molding mixed composition and then mixed together. In addition, small amounts of a plasticizer, a surfactant, and a lubricant were added to the mixture, and then water was added thereto. The mixture was mixed and kneaded with its viscosity adjusted. Thus, a molding mixed composition was obtained. Next, the mixed composition was extrusion-molded by interposing an extrusion molding machine to obtain a honeycomb molded body.

The obtained honeycomb molded body was adequately dried by interposing a microwave drying apparatus and a hot-air drying apparatus and degreased for two hours at 400° C. After that, the honeycomb molded body was held and fired for two hours at 700° C. to manufacture a rectangular-pillar-shaped honeycomb unit (35 mm×35 mm in cross section×150 mm in length) whose cell shape is a rectangle (square). The manufactured rectangular-pillar-shaped honeycomb unit showed 65% opening rate, 63 pieces/cm² cell density, 0.25 mm wall thickness, 38% porosity of all the pores, 12.0% porosity of micro pores (proportion of the porosity of the micro pores to the porosity of all the pores: 32%), 21.5% porosity of macro pores (proportion of the porosity of the macro pores to the porosity of all the pores: 57%), and 236 g/L content of zeolite per apparent unit volume of the honeycomb unit. Note that as Fe ion-exchange zeolite, the one obtained by impregnating an iron nitrate ammonium solution with zeolite particles and exchanging its Fe ions was used. An ion-exchange amount was found by interposing an IPC emission spectrometry using the ICPS-8100 (manufactured by Shimadzu Corporation).

Table 1 shows the kind and particle diameter of the zeolite particles used when the honeycomb unit is manufactured, the firing temperature, the content of zeolite of the honeycomb unit, the porosity of all the pores, the porosity of micro pores and the proportion thereof, and the porosity of macro pores and the proportion thereof.

and then a coating material (same as the bonding material) as a paste was coated on the outer surface of the side wall of the cylindrically-shaped honeycomb aggregate so as to make the thickness of the bonding material paste equal 0.5 mm. Thus, the cylindrically-shaped honeycomb aggregate the same in shape as the honeycomb structure shown in FIG. 1A was manufactured. After being dried and solidified at 120° C., the cylindrically-shaped honeycomb aggregate was held for two hours at 700° C. to degrease the bonding material layer and the coating material. As a result, the cylindrically-shaped (about 144 mm in diameter×150 mm in length) honeycomb structure was manufactured.

Examples 2 through 5 and Comparative Examples 1 and 2

The honeycomb units of examples 2 through 5 and comparative examples 1 and 2 were manufactured in the same manner as example 1 except that the type of zeolite and secondary particle diameter thereof and the firing temperatures were changed as shown in table 1 with respect to the manufacturing conditions of the honeycomb unit of example 2. The content of zeolite, the overall porosity, the porosity of micro pores and the proportion thereof, the porosity of macro pores and the proportion thereof in the manufactured honeycomb units are shown in table 1. The graph in FIG. 3 shows the structure of the pores formed in the cell walls of the honeycomb unit in example 3 as an example of the present

TABLE 1

| | ZEOLITE | | FIRING TEMPERATURE (° C.) | CONTENT OF ZEOLITE (g/L) | POROSITY (%) | | | EVALUATION NOx CONVERSION RATE (%) |
| --- | --- | --- | --- | --- | --- | --- | --- | --- |
| | ZEOLITE TYPE | PARTICLE DIAMETER (μm) | | | MICRO PORES (PROPORTION OF MICRO PORES TO THE WHOLE PORE (%)) | MACRO PORES (PROPORTION OF MACRO PORES TO THE WHOLE PORE (%)) | THE WHOLE PORE | |
| EXAMPLE 1 | Fe-β ZEOLITE | 2 | 700 | 236 | 12.0 (32) | 21.5 (57) | 38 | 98 |
| EXAMPLE 2 | Fe-β ZEOLITE | 6 | 800 | 243 | 9.5 (25) | 24.0 (63) | 38 | 98 |
| EXAMPLE 3 | Fe-β ZEOLITE | 8 | 900 | 250 | 6.5 (17) | 27.0 (71) | 38 | 92 |
| EXAMPLE 4 | Fe-β ZEOLITE | 10 | 1000 | 250 | 5.0 (13) | 29.0 (76) | 38 | 84 |
| EXAMPLE 5 | Fe-ZSM5 ZEOLITE | 2 | 700 | 253 | 15.5 (41) | 17.5 (46) | 38 | 92 |
| COMPARATIVE EXAMPLE 1 | Fe-β ZEOLITE | 15 | 1000 | 238 | 3.3 (9) | 31.0 (82) | 38 | 74 |
| COMPARATIVE EXAMPLE 2 | Fe-β ZEOLITE | 0.5 | 600 | 244 | 19.0 (50) | 14.0 (37) | 38 | 70 |

(Manufacturing of Honeycomb Structure)

A bonding material as a paste was coated on the side surfaces of the manufactured rectangular-pillar-shaped honeycomb units so as to make the thickness of the bonding material layer after being dried 1 mm, and then it was dried and solidified at 120° C. The honeycomb units were bonded together in four columns and four rows so as to align the longitudinal directions of the cells parallel to one another. Thus, an approximately rectangular-parallelepiped honeycomb aggregate was manufactured. In manufacturing the bonding material paste, 29 mass % of alumina particles (average particle diameter: 2 μm), 7 mass % of alumina fibers (average fiber diameter: 6 μm and average fiber length: 100 μm), 34 mass % of alumina sol (solid density: 20 mass %), 5 mass % of carboxymethyl cellulose, and 25 mass % of water were mixed together.

The side surface of the manufactured honeycomb aggregate was cut into a cylindrical shape using a diamond cutter, invention. In the graph in FIG. 3, the horizontal axis and the vertical axis show pore diameter (μm) and log differential pore volume (mL/g), respectively.

(Measuring of NOx Conversion Rate)

A cylindrically-shaped honeycomb structure having a diameter of 30 mm and a length of 50 mm was cut from the honeycomb units manufactured in examples 1 through 5 and comparative examples 1 and 2 to obtain an evaluation sample as a honeycomb structure. The obtained evaluation sample was heated for 48 hours at 700° C. to be simulatively aged and then held at 300° C. Then, gas simulating exhaust gas from an automobile having a composition shown in table 2 was heated to 300° C. and introduced into the evaluation sample at a space velocity (SV) of 35000. The reduction rate (%) of a NO component in the simulated gas before and after the simulated gas was in the evaluation sample was measured as a NOx conversion rate (%). The results of the NOx conversion rate (%) are shown in table 1.

TABLE 2

| SIMULATED GAS | COMPOSITION |
|---|---|
| N2 | Balance |
| CO2 | 5 vol % |
| O2 | 14 vol % |
| NO | 350 ppm |
| NH3 | 350 ppm |
| H2O | 5 vol % |
| SV | 35000/hr |

(Evaluation Results)

As apparent from the results shown in table 1, the NOx conversion rates of the evaluation samples of examples 1 through 5 were 84% through 98%. On the other hand, the NOx conversion rates of the evaluation samples of comparative examples 1 and 2, in which the number of the micro pores or the macro pores is not within the range specified in the embodiment of the present invention, were 70% and 74%, respectively.

As described above, it is found that the honeycomb units of examples 1 through 5 are suitable for converting exhaust gas from an automobile.

Because the honeycomb structure according to the embodiment of the present invention has a high NOx conversion rate, it can be used as a catalyst for converting exhaust gas from an automobile, which is required to be reduced in size and weight. Particularly, it is suitable as a NOx conversion catalyst for a SCR system (for example, an exhaust gas conversion system using ammonia) using a zeolite catalyst.

The present invention is not limited to the specifically disclosed embodiment, but variations and modifications may be made without departing from the scope of the present invention.

What is claimed is:

1. A honeycomb structure comprising:
    at least one honeycomb unit having a longitudinal direction and comprising:
        zeolite a content of which per apparent unit volume of the at least one honeycomb unit is about 230 g/L or greater;
        an inorganic binder; and
        plural cell walls extending from one end face to another end face along the longitudinal direction to define plural cell walls, the cell walls including pores, a porosity of pores having diameters in a range of about 0.005 μm through about 0.02 μm in the cell walls being about 5% through about 40% or less, a porosity of pores having diameters in a range of about 0.05 μm through about 0.2 μm in the cell walls being about 17.5% through about 40% or less.

2. The honeycomb structure according to claim 1, wherein the pores having diameters in a range of about 0.005 μm through about 0.2 μm in the cell walls account for about 13% through about 41% of the substantially all pores, and
    the pores having diameters in a range of about 0.05 μm through about 0.2 μm in the cell walls account for about 46% through about 76% of the substantially all pores.

3. The honeycomb structure according to claim 1, wherein an opening rate of the at least one honeycomb unit is in a range of about 50% through about 65%.

4. The honeycomb structure according to claim 1, wherein a thickness of the cell walls is in a range of about 0.15 mm through about 0.35 mm.

5. The honeycomb structure according to claim 1, wherein the zeolite comprises at least one of β zeolite, Y zeolite, ferrierite, ZSM5 zeolite, mordenite, faujasite, zeolite A, and zeolite L.

6. The honeycomb structure according to claim 1, wherein the zeolite has a molar ratio of silica to alumina (silica/alumina ratio) in a range of about 30 through about 50.

7. The honeycomb structure according to claim 1, wherein an ion of the zeolite is exchanged by at least one of Fe, Cu, Ni, Co, Zn, Mn, Ti, Ag, and V.

8. The honeycomb structure according to claim 1, wherein the at least one honeycomb unit comprises at least one of alumina particles, titania particles, silica particles, zirconia particles, and precursors thereof.

9. The honeycomb structure according to claim 1, wherein the inorganic binder comprises at least one of alumina sol, silica sol, titania sol, water glass, sepiolite sol, and attapulgite sol.

10. The honeycomb structure according to claim 1, wherein
    the at least one honeycomb unit comprises inorganic fibers.

11. The honeycomb structure according to claim 10, wherein
    the inorganic fibers comprise at least one of alumina fibers, silica fibers, silicon carbide fibers, silica alumina fibers, glass fibers, potassium titanate fibers, and aluminum borate fibers.

12. The honeycomb structure according to claim 1, wherein
    the at least one honeycomb unit comprises plural honeycomb units which are bonded together through a bonding material.

13. The honeycomb structure according to claim 1, wherein
    a side surface of the honeycomb structure is covered with a coating material layer.

14. The honeycomb structure according to claim 1, wherein
    a content of the zeolite per apparent unit volume of the at least one honeycomb unit is about 270 g/L or less.

15. The honeycomb structure according to claim 1, wherein
    a content of the zeolite per apparent unit volume of the at least one honeycomb unit is in a range of about 245 g/L through about 270 g/L.

16. The honeycomb structure according to claim 1, wherein
    the porosity of substantially all pores in the cell walls is in a range of about 25% through about 40%.

17. The honeycomb structure according to claim 1, wherein
    a content of the zeolite in the at least one honeycomb unit is in a range of about 60 mass % through about 80 mass %.

18. The honeycomb structure according to claim 1, wherein
    the zeolite contains secondary particles.

19. The honeycomb structure according to claim 18, wherein
    an average particle diameter of the secondary particles of the zeolite is in a range of about 0.5 μm through about 10 μm.

20. The honeycomb structure according to claim 1, wherein
    the inorganic binder includes inorganic sol and a clay binder.

21. The honeycomb structure according to claim 1, wherein
the at least one honeycomb unit contains inorganic particles other than the zeolite.

22. The honeycomb structure according to claim 21, wherein
an average particle diameter of secondary particles of the inorganic particles other than the zeolite is smaller than or equal to an average particle diameter of secondary particles of the zeolite.

23. The honeycomb structure according to claim 21, wherein
an average particle diameter of the inorganic particles other than the zeolite is in a range of about one through about one-tenth of an average particle diameter of the zeolite.

24. The honeycomb structure according to claim 21, wherein
a content of the inorganic particles other than the zeolite contained in the at least one honeycomb unit is in a range of about 3 mass % through about 30 mass %.

25. The honeycomb structure according to claim 10, wherein
an aspect ratio of the inorganic fibers is in a range of about 2 through about 1000.

26. The honeycomb structure according to claim 10, wherein
a content of the inorganic fibers contained in the at least one honeycomb unit is in a range of about 3 mass % through about 50 mass %.

27. The honeycomb structure according to claim 1, wherein
a catalyst component is provided on the cell walls.

28. The honeycomb structure according to claim 27, wherein
the catalyst component comprises at least one of a precious metal, an alkali metal compound, and an alkali earth metal compound.

29. The honeycomb structure according to claim 1, wherein the honeycomb structure is so constructed that a periphery of the honeycomb structure is cut.

30. The honeycomb structure according to claim 12, wherein
the bonding material is dried and solidified.

31. The honeycomb structure according to claim 13, wherein
the coating material layer dried and solidified.

32. The honeycomb structure according to claim 12, wherein the honeycomb structure is formed into a predetermined shape in such a manner that the plural honeycomb units are bonded together.

33. The honeycomb structure according to claim 1, wherein the honeycomb structure is composed of one honeycomb unit.

34. The honeycomb structure according to claim 1, wherein the honeycomb structure is so constructed to be used as a catalyst for converting exhaust gas from an automobile.

35. The honeycomb structure according to claim 1, wherein the honeycomb structure is so constructed to be used as a NOx conversion catalyst for a SCR system.

36. A honeycomb structure comprising:
at least one honeycomb unit having a longitudinal direction and comprising:
zeolite a content of which per apparent unit volume of the at least one honeycomb unit is about 230 g/L or greater;
an inorganic binder; and
plural cell walls extending from one end face to another end face along the longitudinal direction, a total porosity value of the cell walls being about 40% or less, the total porosity value comprising at least a first porosity value plus a second porosity value, the first porosity value being about 5% or greater and corresponding to pores having diameters in a range of about 0.005 µm through about 0.02 µm in the cell walls, the second porosity value being about 17.5% or greater and corresponding to pores having diameters in a range of about 0.05 µm through about 0.2 µm in the cell walls.

* * * * *